US012326679B2

(12) United States Patent
Nakamoto et al.

(10) Patent No.: US 12,326,679 B2
(45) Date of Patent: Jun. 10, 2025

(54) IMAGE FORMING APPARATUS THAT FORMS IMAGES ON A RECORDING MATERIAL

(71) Applicant: CANON KABUSHIKI KAISHA, Tokyo (JP)

(72) Inventors: Atsushi Nakamoto, Tokyo (JP); Kazuhiro Doda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/587,623

(22) Filed: Feb. 26, 2024

(65) Prior Publication Data

US 2024/0255872 A1 Aug. 1, 2024

Related U.S. Application Data

(62) Division of application No. 17/882,455, filed on Aug. 5, 2022, now Pat. No. 11,947,290.

(30) Foreign Application Priority Data

Aug. 30, 2021 (JP) ................................ 2021-139656

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
See application file for complete search history.

(56) References Cited

U.S. PATENT DOCUMENTS

| | | | | |
|---|---|---|---|---|
| 10,983,461 | B2 | 4/2021 | Kurata | |
| 2007/0059002 | A1 * | 3/2007 | Yamamoto | G03G 15/2042 399/45 |
| 2007/0071475 | A1 | 3/2007 | Blair et al. | |

(Continued)

FOREIGN PATENT DOCUMENTS

| | | | |
|---|---|---|---|
| CN | 103885311 | A | 6/2014 |
| DE | 102007060022 | A1 | 6/2009 |

(Continued)

OTHER PUBLICATIONS

Japanese Office Action dated Mar. 5, 2025 in counterpart Japanese Patent Appln. No. 2021-139656.

*Primary Examiner* — Stephanie E Bloss
*Assistant Examiner* — Michael A Harrison
(74) *Attorney, Agent, or Firm* — Venable LLP

(57) ABSTRACT

An image forming apparatus includes first and second rotatable members forming a nip therebetween, a heater disposed in inside of the second rotatable member, a first temperature sensor provided on a center of the heater, a second temperature sensor provided on an end side of the heater. A controller controls a feeding interval in which a trailing edge of a preceding sheet passes through the nip until a leading edge of a subsequent sheet reaches the nip. The controller controls the feeding interval to be a first interval in a case which a feeding speed of the sheet is a first speed and a detected temperature by the second sensor is a first temperature, and to be a second interval shorter than the first interval in a case which the feeding speed is a second speed lower than the first speed and the detected temperature is the first temperature.

6 Claims, 8 Drawing Sheets

(56) References Cited

U.S. PATENT DOCUMENTS

| | | | | |
|---|---|---|---|---|
| 2012/0230742 | A1 | 9/2012 | Nakagawa et al. | G03G 15/20 |
| 2012/0243894 | A1 | 9/2012 | Umeda et al. | G03G 15/20 |
| 2013/0058692 | A1* | 3/2013 | Cheng | G03G 15/6529 399/367 |
| 2015/0086231 | A1* | 3/2015 | Bush | G03G 15/2042 399/69 |
| 2015/0331371 | A1 | 11/2015 | Nakajima | G03G 15/20 |
| 2016/0033908 | A1 | 2/2016 | Tsunashima et al. | G03G 15/20 |
| 2016/0327894 | A1 | 11/2016 | Tsunashima et al. | G03G 15/20 |
| 2016/0342117 | A1 | 11/2016 | Minamishima et al. | G03G 15/20 |
| 2017/0060052 | A1 | 3/2017 | Narahara et al. | G03G 15/20 |
| 2017/0315485 | A1 | 11/2017 | Tsunashima et al. | G03G 15/20 |
| 2017/0343929 | A1 | 11/2017 | Narahara et al. | G03G 15/20 |
| 2018/0074444 | A1 | 3/2018 | Wakatsu et al. | G03G 15/20 |
| 2018/0074445 | A1 | 3/2018 | Nishida et al. | G03G 15/20 |
| 2018/0173140 | A1 | 6/2018 | Imaizumi et al. | G03G 15/20 |
| 2018/0181039 | A1 | 6/2018 | An et al. | G03G 15/20 |
| 2018/0348678 | A1 | 12/2018 | Nakamoto et al. | G03G 15/20 |
| 2018/0373189 | A1 | 12/2018 | Wakatsu et al. | G03G 15/20 |
| 2019/0171145 | A1 | 6/2019 | Imaizumi et al. | G03G 15/20 |
| 2020/0110359 | A1 | 4/2020 | Ito et al. | G03G 21/206 |
| 2020/0233346 | A1 | 7/2020 | Sato et al. | G03G 15/20 |
| 2020/0233348 | A1 | 7/2020 | Nakajima et al. | G03G 15/20 |
| 2020/0233350 | A1 | 7/2020 | Oi et al. | G03G 15/20 |
| 2020/0233352 | A1 | 7/2020 | Doda et al. | G03G 15/20 |
| 2020/0249600 | A1 | 8/2020 | Yoshida et al. | G03G 15/20 |
| 2020/0301330 | A1 | 9/2020 | Yoshida et al. | G03G 15/20 |
| 2020/0371459 | A1 | 11/2020 | Takeda et al. | G03G 15/20 |
| 2021/0063923 | A1 | 3/2021 | Odate et al. | G03G 15/20 |
| 2021/0072680 | A1 | 3/2021 | Yoshida et al. | G03G 15/20 |
| 2021/0072684 | A1 | 3/2021 | Doda et al. | G03G 15/20 |
| 2021/0132528 | A1 | 5/2021 | Sato et al. | G03G 15/20 |
| 2021/0165351 | A1 | 6/2021 | Doda et al. | G03G 15/20 |
| 2021/0232072 | A1 | 7/2021 | Nakajima et al. | G03G 15/20 |
| 2021/0278793 | A1 | 9/2021 | Maeda et al. | G03G 15/00 |
| 2021/0278794 | A1 | 9/2021 | Nakajima | G03G 15/20 |
| 2021/0333732 | A1 | 10/2021 | Yoshida et al. | G03G 15/20 |
| 2021/0333733 | A1 | 10/2021 | Doda et al. | G03G 15/20 |
| 2022/0057736 | A1 | 2/2022 | Doda et al. | G03G 15/20 |
| 2022/0100128 | A1 | 3/2022 | Nakamoto et al. | G03G 15/20 |
| 2022/0253006 | A1 | 8/2022 | Doda et al. | G03G 15/20 |
| 2022/0299912 | A1 | 9/2022 | Yoshida et al. | G03G 15/20 |
| 2022/0299914 | A1 | 9/2022 | Doda | G03G 15/20 |
| 2022/0308509 | A1 | 9/2022 | Wakatsu et al. | G03G 15/20 |
| 2022/0365475 | A1 | 11/2022 | Nakajima et al. | G03G 15/00 |
| 2023/0065569 | A1 | 3/2023 | Wakatsu et al. | G03G 15/20 |
| 2023/0067803 | A1 | 3/2023 | Yoshida et al. | G03G 15/20 |

FOREIGN PATENT DOCUMENTS

| | | |
|---|---|---|
| JP | 2002-169413 | 6/2002 |
| JP | 2003-050519 | 2/2003 |
| JP | 2003-076171 | 3/2003 |
| JP | 2019-144451 A | 8/2019 |
| JP | 2020-016843 A | 1/2020 |
| WO | 2018/225874 | 4/2020 |

* cited by examiner

IMAGE FORMING APPARATUS THAT FORMS IMAGES ON A RECORDING MATERIAL

This application is a divisional of application Ser. No. 17/882,455 filed Aug. 5, 2022, currently pending; and claims priority under 35 U.S.C. § 119 to Japan Application JP 2021-139656 filed in Japan on Aug. 30, 2021; and the contents of all of which are incorporated herein by reference as if set forth in full.

FIELD OF THE INVENTION AND RELATED ART

The present invention relates to an image forming apparatus for forming images on a recording material.

In an image forming apparatus of the electrophotographic method, a toner image transferred on the recording material is heated and pressured by a fixing device to fix the image on the recording material. A film fixing method using heat-generating members and cylindrical film is a widely known fixing method for fixing devices. In the fixing device, in a fixing nip portion through which the fed recording material passes, if recording materials whose width is smaller than the maximum width that can pass through the fixing nip portion pass continuously, excessive heating of the non-paper passing area, the area of the fixing nip portion through which the recording material does not pass, will occur. In order to suppress such non-paper passing portion temperature increase, the following configuration is known for image forming apparatuses. The image forming apparatus has a temperature detecting element that detects the temperature of a heater corresponding to the end side area of the fixing nip portion, which is inside the maximum paper width of the feedable recording material and outside the minimum paper width of the feedable recording material. According to the heater temperature detected by the temperature detecting element, the feeding interval of recording materials is controlled to be extended (lengthened) to suppress the non-paper passing portion temperature increase in the fixing nip portion (for example, Japanese Laid-Open Patent Application No. 2002-169413).

As explained above, the image forming apparatus controls the feeding interval of the recording material according to the heater temperature detected by the temperature detecting element in order to suppress the temperature increase of the non-paper passing portion in the fixing nip portion.

However, when controlling the feeding interval of the recording material, it does not support the feeding speed of the recording material or the feeding interval according to the type of the recording material. This causes a problem affecting the throughput (the number of printable sheets per a given time).

SUMMARY OF THE INVENTION

According to an aspect of the present invention, there is provided an image forming apparatus comprising: an image forming unit configured to carry out an image formation on a recording material; a first rotatable member; a second rotatable member contacting an outer peripheral surface of the first rotatable member and configured to form a nip portion between itself and the first rotatable member; a heater disposed in an inside space of the second rotatable member; a first temperature detecting unit provided on the heater at a central position with respect to a longitudinal direction of the heater; a second temperature detecting unit provided at a position closer to an end side of the heater than the first temperature detecting unit with respect to the longitudinal direction of the heater; and a control unit configured to control a feeding interval in which a trailing edge of a preceding recording material passes through the nip portion until a leading edge of a subsequent recording material reaches the nip portion, wherein the control unit controls the feeding interval to be a first interval so that a number of printable sheets per unit time becomes a first number in a case in which a feeding speed of the preceding recording material and the subsequent recording material is a first feeding speed and a temperature detected by the second temperature detecting unit is a first temperature, and wherein the control unit controls the feeding interval to be a second interval shorter than the first interval so that the number of printable sheets per unit time becomes a second number smaller than the first number in a case in which the feeding speed of the preceding recording material and the subsequent recording material is a second feeding speed lower than the first feeding speed and the temperature detected by the second temperature detecting unit is the first temperature.

Further features of the present invention will become apparent from the following description of exemplary embodiments (with reference to the attached drawings).

DESCRIPTION OF THE EMBODIMENTS

The following is a detailed explanation of an embodiment of the present invention with reference to the drawings. In the following embodiment, passing a recording material through a fixing nip portion of a fixing device is referred to as feeding. In the fixing nip portion, the area where the recording material is not fed is called a non-paper passing area (or non-paper passing portion), and the area where the recording material is fed is called a paper passing area (or paper passing portion). Furthermore, the phenomenon in which the temperature of the non-paper passing area of the fixing nip portion becomes higher than that of the paper passing area is called non-paper passing portion temperature increase.

Embodiment

[Configuration of an Image Forming Apparatus and Image Forming Operation]

Figure 1:
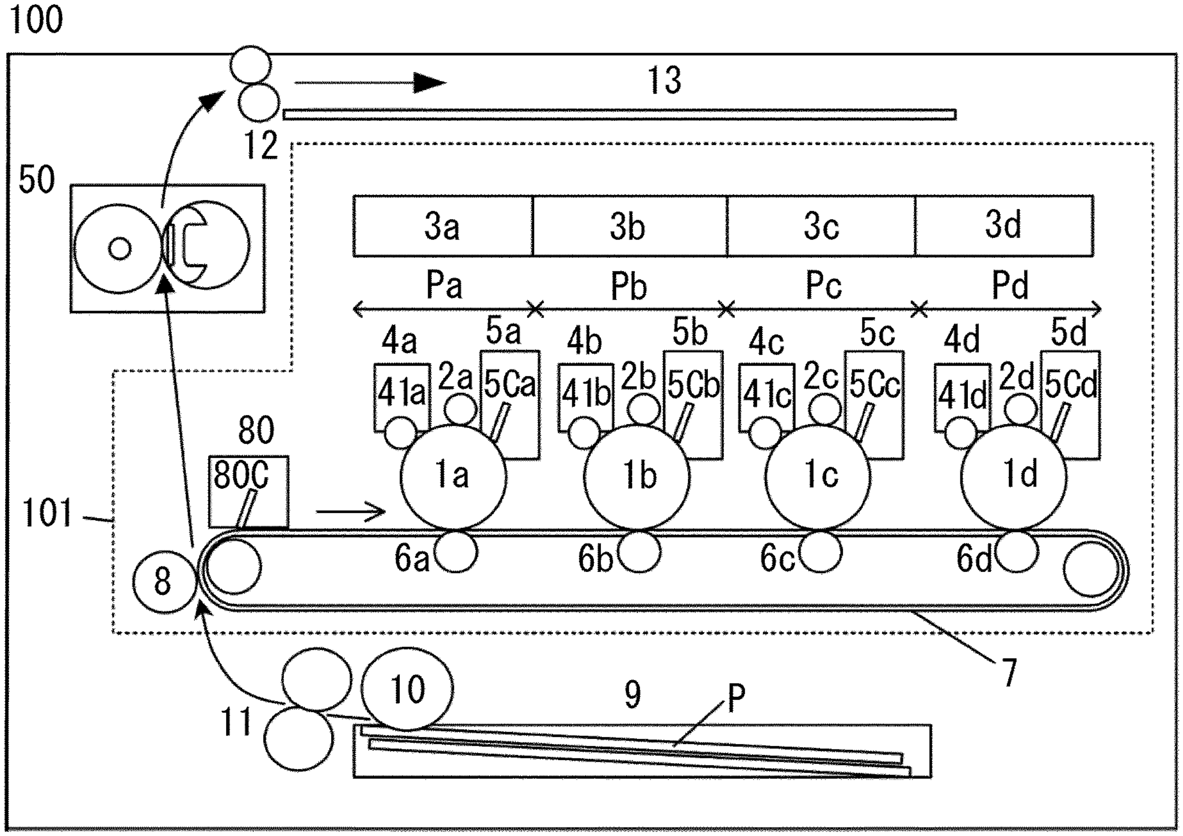
FIG. 1 is a schematic cross-sectional drawing showing the configuration of an image forming apparatus according to an embodiment

FIG. 1 is a cross-sectional view of an image forming apparatus 100 including a fixing device 50. A process speed, which is a feeding speed of the recording material in the image forming apparatus 100 of the present embodiment, is 180 mm/s in the case of full speed. The throughput when the process speed is at full speed is 30 ppm, which allows printing of 30 A4 size recording materials per minute. The image forming apparatus 100 in the present embodiment has a full-speed process speed as well as a half-speed process speed, which is roughly half of the full-speed process speed, for printing on thick paper and other recording materials.

In FIG. 1, an image forming portion 101 (the portion surrounded by dashed lines in the figure) that forms a toner image on a recording material P has four image forming stations Pa, Pb, Pc, and Pd. At the image forming stations Pa, Pb, Pc, and Pd, yellow, magenta, cyan, and black toner images are formed, respectively. Furthermore, in the image forming portion 101, corresponding to each image forming station Pa, Pb, Pc, and Pd, there are laser scanners 3*a*, 3*b*, 3*c*, and 3*d* that form electrostatic latent images on a photosensitive drum 1 at each image forming station. Each image forming station Pa, Pb, Pc, Pd has photosensitive drums 1*a*, 1*b*, 1*c*, 1*d* as image bearers, charging rollers 2*a*, 2*b*, 2*c*, 2*d*, and developers 4*a*, 4*b*, 4*c*, 4*d* with developing rollers 41*a*, 41*b*, 41*c*, 41*d*. Each image forming station Pa, Pb, Pc, and Pd has the same configuration, and a, b, c, and d are appended to the end of each image forming station Pa, Pb, Pc, and Pd member. In the following, a, b, c, and d at the end of the codes are omitted except when referring to a specific image forming station member.

At each image forming station Pa, Pb, Pc, and Pd, a charging roller 2 charges the surface of a photosensitive drum 1 to a uniform potential. The photosensitive drum 1 is charged to a uniform potential and irradiated with a laser beam corresponding to an image data from a laser scanner 3 to form an electrostatic latent image on the photosensitive drum 1 (on the image carrier) in accordance with the image data. A toner image is then formed on the photosensitive drum 1 when a developer roller 41 of a developer 4 adheres the toner to the electrostatic latent image formed on the photosensitive drum 1. The toner images formed on the photosensitive drums 1 of each image forming station Pa, Pb, Pc, and Pd are superimposed and transferred sequentially to an intermediate transfer belt 7 rotating in the arrow direction (clockwise direction) in the Figure by a primary transfer member 6 provided at a position opposite the photosensitive drum 1. The toner remaining on the photosensitive drum 1 that has not been transferred to the intermediate transfer belt 7 is removed by a cleaning blade 5C of a cleaner 5. The toner image transferred to the intermediate transfer belt 7 is fed to a secondary transfer nip portion formed by the contact between the intermediate transfer belt 7 and a secondary transfer roller 8 in order to transfer it to the recording material P.

On the other hand, a feeding cassette 9, which is a feeding portion, contains the recording material P. When an image forming operation is started, a feeding roller 10 feeds the material one sheet at a time onto the feeding path. The recording material P fed by the feeding roller 10 is fed to a secondary transfer nip portion by a transfer roller 11. In the secondary transfer nip portion, the toner image on the intermediate transfer belt 7 is transferred to the recording material P. The toner remaining on the intermediate transfer belt 7 without being transferred to the recording material P is removed by a cleaning blade 80C of an intermediate transfer belt cleaner 80.

The recording material P to which the toner image has been transferred in the secondary transfer nip portion is fed to a fixing device 50, where it is heated and pressurized, and the toner image is fixed to the recording material P. The recording material P that has passed through the fixing device 50 is then ejected by an ejection roller 12 to an ejection portion 13.

[Configuration and Operation of the Fixing Device]

Figure 2:
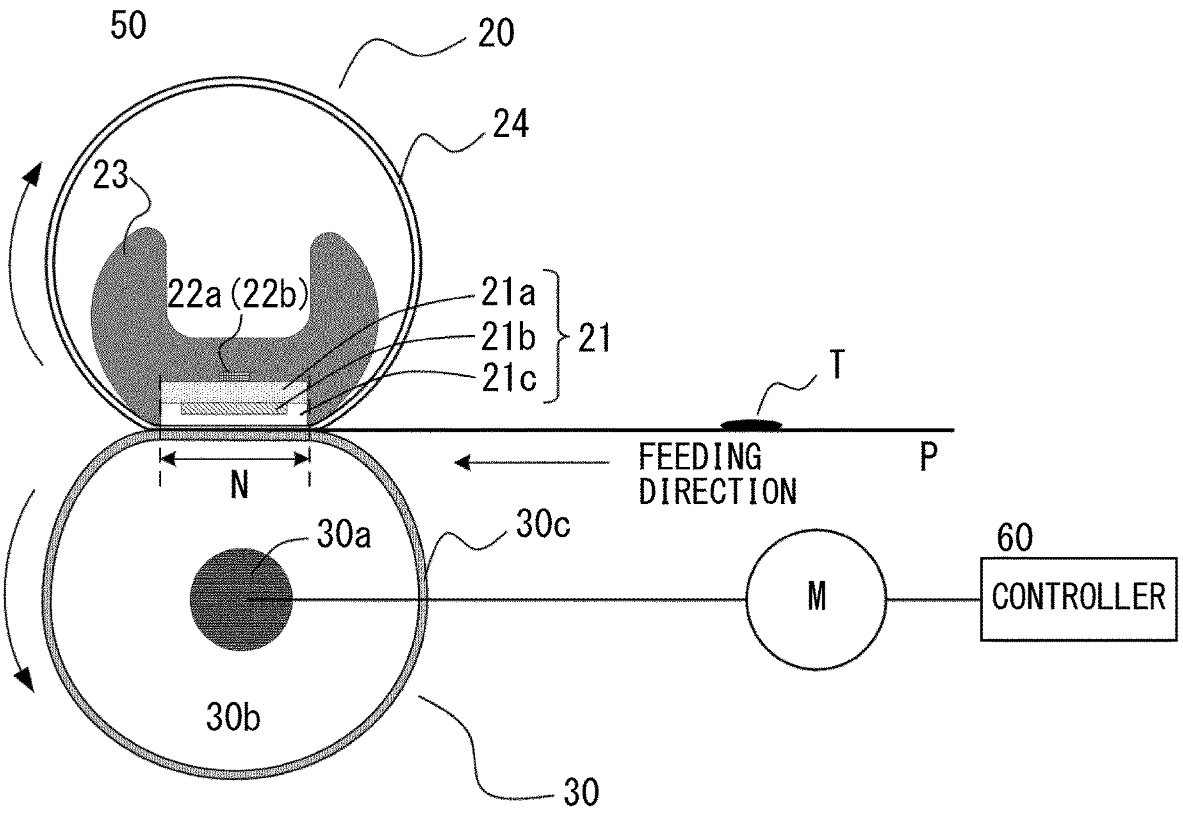
FIG. 2 is a schematic cross-sectional drawing showing a fixing device according to an embodiment.
Figure 3:
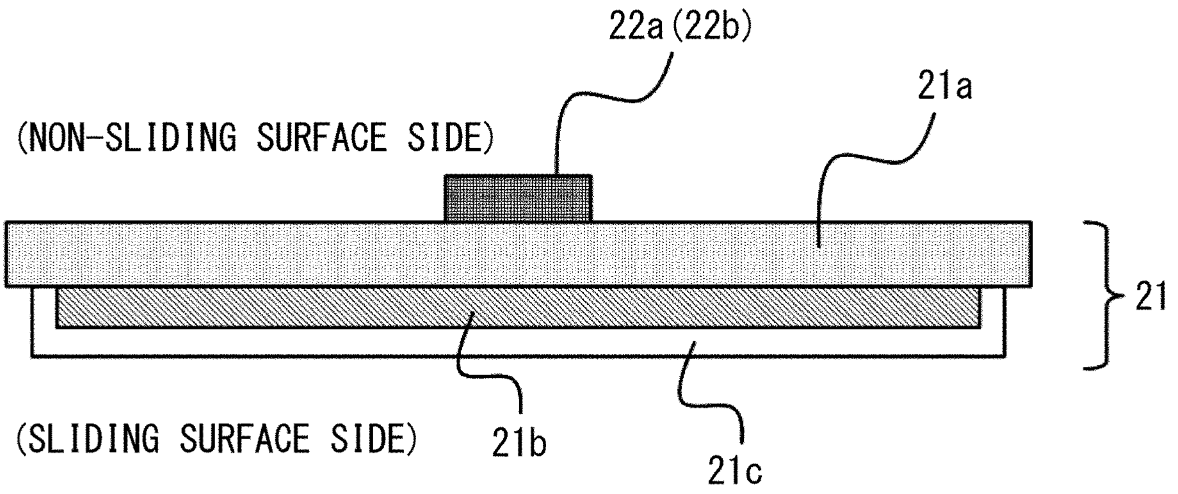
FIG. 3 is a schematic cross-sectional drawing showing a heater configuration according to an embodiment.

Next, the configuration of the fixing device 50 and the fixing operation of the fixing device 50 on the recording material P are explained. FIG. 2 is a schematic cross-sectional drawing of the present embodiment of the fixing device 50. FIG. 3 is a schematic cross-sectional drawing showing the schematic configuration of a ceramic heater 21 of the fixing device 50. The film sliding surface side refers to the side of the ceramic heater 21 that slides against a film 24, and the film non-sliding side refers to the side of the ceramic heater 21 that does not slid against the film 24.

Figure 4:
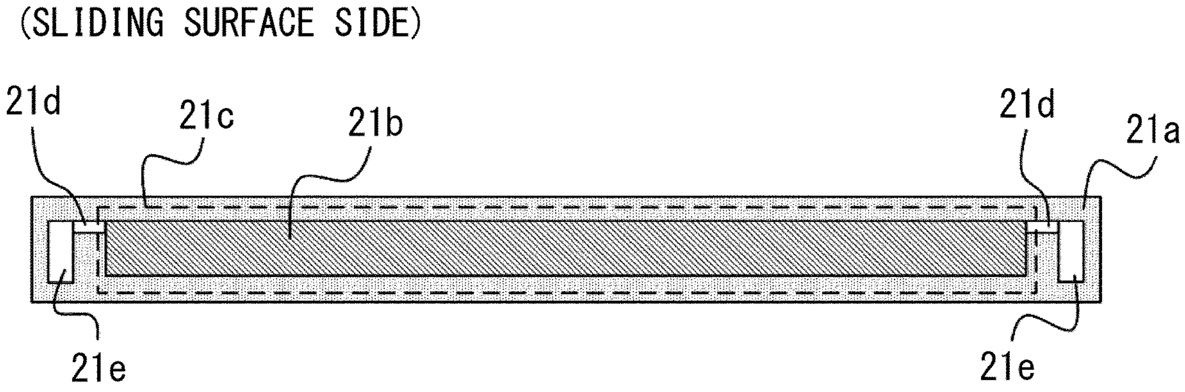
FIG. 4 is a schematic drawing showing a heater configuration according to an embodiment.
Figure 5:
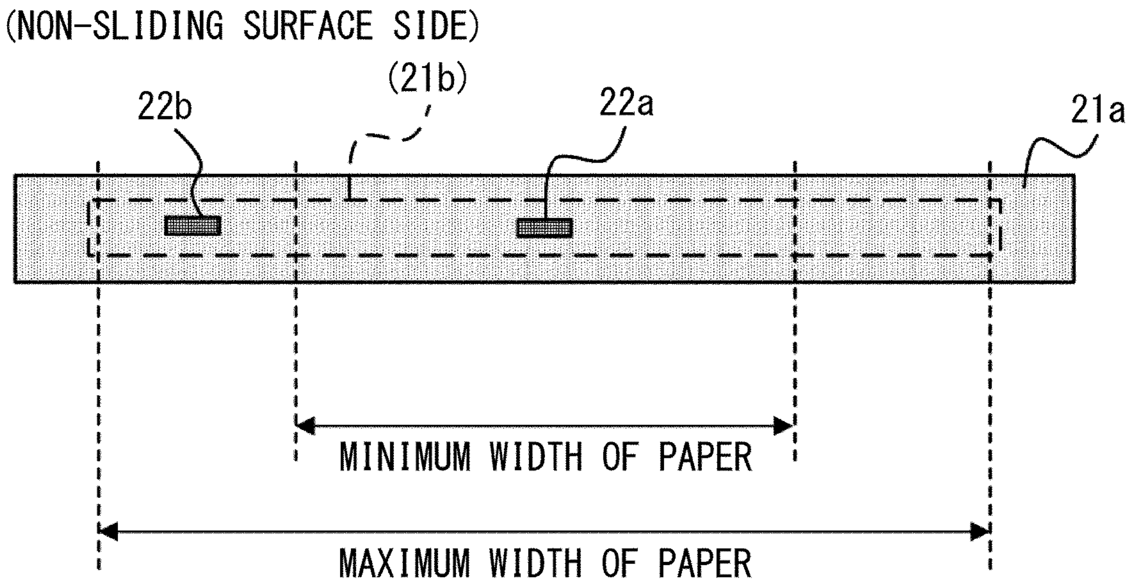
FIG. 5 is a schematic drawing showing a thermistor location according to an embodiment.
Figure 6:
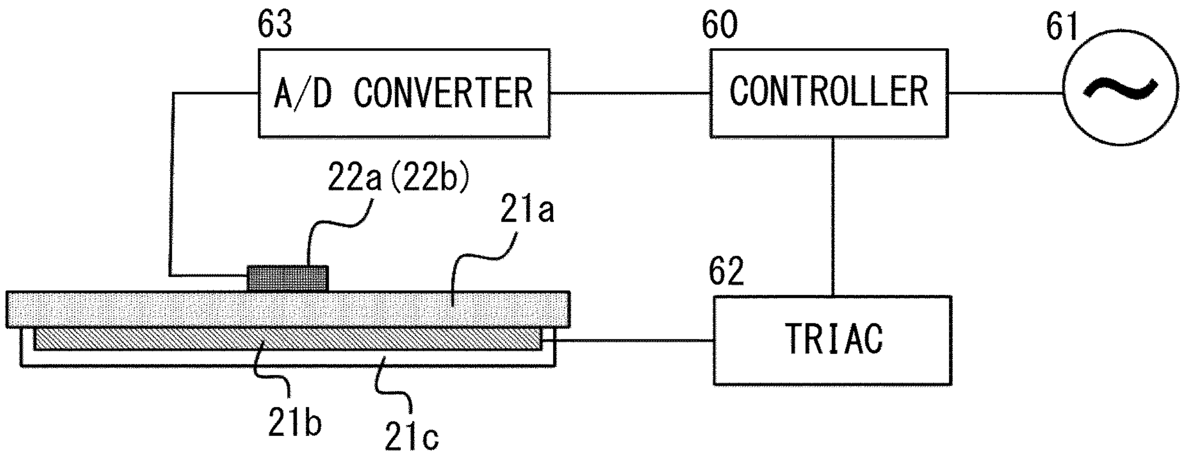
FIG. 6 is a control block drawing showing a control portion that controls a power supply for a heater according to an embodiment.

FIG. 4 is a schematic drawing showing the configuration of the ceramic heater 21 when viewed from a film sliding surface side where it slides against a fixing film 24. FIG. 5 shows a schematic drawing of the ceramic heater 21 viewed from the film non-sliding surface side opposite to the film sliding surface, showing the location of the thermistor. FIG. 6 is a control block diagram explaining the control system that controls the power supply to the ceramic heater 21.

[Configuration of the Fixing Device]

First, the configuration of the fixing device 50 of the present embodiment is explained. As shown in FIG. 2, the fixing device 50 of the present embodiment has a heating unit 20 and a pressing roller 30, which is the first rotatable member that forms the fixing nip portion N in contact with the fixing film 24 belonging to the heating unit 20. The heating unit 20 and pressing roller 30 are both long members in the orthogonal direction (hereinafter "longitudinal direction") to the recording material feeding direction (arrow direction shown in FIG. 2) in which the recording material P on which the toner image T is transferred is fed to the fixing nip portion N.

(Heating Unit)

A heating unit 20 has a ceramic heater (hereinafter referred to as "heater") 21, a thermistor 22*a*, a sub-thermistor 22*b*, a cylindrical fixing film 24, which is the second rotatable member, and a fixing film guide 23. The fixing film guide 23 is formed using heat-resistant material and has a recess at the top of the cut surface shown in FIG. 2, and a slit on a pressing roller 30 side (fixing nip portion N side) in the longitudinal direction. The fixing film 24 is cylindrically formed so that the inner circumference of the film is a predetermined length longer than the outer circumference of the fixing film guide 23, and is loosely fitted to the fixing film guide 23 without tension. The fixing film 24 has a two-layer structure in which the outer peripheral surface of an unbroken film base layer composed mainly of polyimide is covered by an unbroken surface layer composed mainly of PFA.

As shown in FIG. 2, a heater 21, a thermistor 22*a*, and a sub-thermistor 22*b* are supported in a slit in the fixing film guide 23. The heater 21 is located in the inner space of the cylindrical fixing film 24. The heater 21 has a thin plate 21*a* that is made mainly of alumina, aluminum nitride, or other ceramics. As shown in FIG. 3, a heat-generating resistor 21*b* mainly composed of silver, palladium, etc. is placed along the longitudinal direction of the plate 21*a* on the film sliding surface side of the plate 21*a*. A protective layer 21*c*, which is mainly composed of glass or a heat-resistant resin such as fluororesin or polyimide, is formed to cover the heat-generating resistor 21*b*. As shown in FIG. 4, a heat-generating resistor 21*b* is pattern printed along the longitudinal direction of the plate 21*a* on the film sliding surface side of the plate 21*a*. In addition, a conductive portion 21*d* electrically connected to the heat-generating resistor 21*b* and an electrode 21*e* connected to the conductive portion 21*d* are also pattern printed. Then, a protective layer 21*c* (the area enclosed by the dashed line in FIG. 4) is formed to cover the heat-generating resistor 21*b*.

On the other hand, as shown in FIG. 3, a main thermistor 22*a*, which is the first temperature detecting unit, and a sub-thermistor 22*b*, which is the second temperature detecting unit, are located on the film non-sliding surface side of the plate 21*a*, contacting the plate 21*a*. In detail, as shown in FIG. 5, the main thermistor 22*a* is located near the center of the plate 21*a* of heater 21 and detects the temperature of the area of the fixing nip portion N (paper passing area) where the minimum width of a recording material P that can be fed into the fixing nip portion N passes through. In FIG. 5, the dashed line indicates the heat-generating resistor 21*b* on the film sliding surface side of heater 21. On the other hand, the sub-thermistor 22*b* is located near the edge of the substrate 21*a* of the heater 21, corresponding to the non-paper passing area in the fixing nip portion N where the maximum width of the recordable material P passes through and the minimum width of the recordable material P does not pass through. In the case of continuous printing of recording material P that is smaller in width than the maximum width of the paper that can be fed, a control portion 60, described below, uses the sub-thermistor 22*b* to detect the temperature of the heater 21 corresponding to the non-paper passing area of the fixing nip portion N.

(Pressing Roller)

As shown in FIG. 2, pressing roller 30 has a core 30*a* made of a metallic material such as iron, SUS, or aluminum. On the outer peripheral surface of the shaft portion connecting the two ends of the core 30*a* in the longitudinal direction, an elastic layer 30*b* mainly composed of silicone rubber or the like is formed. On the outer peripheral surface of the elastic layer 30*b*, a detachable layer 30*c* is formed, which is mainly composed of PTFE, PFA or FEP. The shafts at both ends of the longitudinal direction of the core 30*a* are rotatably supported by the frame of the fixing device 50, and a gear driven by a motor (indicated as M in FIG. 2) is attached to the longitudinal direction end of the core 30*a*.

[Operation of the Fixing Device]

(Heating Fixing Operation)

Next, the heating fixing operation of the fixing device 50 is explained. In FIG. 2, a control portion 60, which is a control unit, has a CPU (not shown), ROM (not shown), and RAM (not shown), and controls the heating fixing operation of the fixing device 50. The ROM stores control programs and data executed by the CPU to control the fixing device 50, while the RAM is used for temporary data storage. The control portion 60 drives a motor M to rotate in response to the print signal, and the motor M rotates a pressing roller 30 in the direction of the arrow in FIG. 2 (counterclockwise direction). Following the rotation of the pressing roller 30, the fixing film 24 of the heating unit 20 rotates in the direction of the arrow in FIG. 2 (clockwise direction) while its inner peripheral surface (inner surface) slides against the heater 21 and fixing film guide 23. The recording material P on which an unfixed toner image T is transferred is fed between the pressing roller 30 and the outer peripheral surface (outer surface) of the fixing film 24 in the fixing nip portion N. The toner image T is then fed to the fixing film 24. The toner image T is heated by the heat of the surface of fixing film 24 heated by heater 21, and is fixed on the recording material P. The control portion 60 stops driving the motor M after the recording material P on which the toner image T is fixed passes through the fixing nip portion N and is ejected from the fixing device 50.

The control of fixing device 50 by the control portion 60 is explained with reference to FIG. 6. The control portion 60 obtains the detected temperature of the main thermistor 22*a*, which detects the temperature of the heater 21, via the A/D conversion circuit 63. The control portion 60 controls the power supply to the heater 21 by switching the on/off state of a bi-directional thyristor (hereinafter referred to as "triac") 62 so that the detected temperature of the main thermistor 22*a* obtained maintains the fusing temperature (target temperature) of the fixing device 50. In detail, the control portion 60 controls the on/off state of the triac 62 to supply (apply) AC voltage input from a commercial AC power source 61 to the heater 21. AC voltage from the commercial AC power source 61 is input to an electrode 21*e* (FIG. 4) of the heater 21 via the triac 62, and the heat-generating resistor 21*b* is supplied with power through the conductive portion 21*d* (FIG. 4). The heat-generating resistor 21*b* is heated by the power supply from the commercial AC power source 61, and the heater 21 rapidly raises the temperature to heat the fixing film 24 at the fixing nip portion N. When the recording material P passes through the fixing nip portion N and the image forming process is completed, the control portion 60 turns off the triac 62 and stops supplying AC voltage from the commercial AC power source 61.

(Detection of Non-Paper Passing Portion Temperature Increase)

As described above, the control portion 60 controls the heating fixing operation of the recording material P in the fixing nip portion N of the fixing device 50 based on the temperature of the heater 21 detected by the main thermistor 22*a*. The control portion 60 also acquires the temperature of the heater 21 corresponding to the non-paper passing area of the fixing nip portion N detected by the sub-thermistor 22*b* via the A/D conversion circuit 63 to detect the temperature of the heater 21 corresponding to the non-paper passing area of the fixing nip portion N. As shown in FIG. 5, when printing is continuously performed on the smallest possible width of recording material P, the temperature of the heater 21 corresponding to the paper passing area of the fixing nip portion N through which the recording material P is fed decreases. On the other hand, the temperature of the heater 21 corresponding to the non-paper passing area of the fixing nip portion N, where the sub-thermistor 22*b* is located and the recording material P is not fed, rises and becomes hot. Thus, control portion 60 acquires the temperature detected by sub-thermistor 22*b* located at the end side of the longitudinal direction of the heater 21, corresponding to the non-paper passing area of the fixing nip portion N, through which the small-sized recording material P does not pass.

This allows detecting the temperature of the heater 21 corresponding to the non-paper passing area of the fixing nip portion N.

(Process Speed Settings)

In the present embodiment, the process speed of the image forming apparatus 100 is set according to the basis weight of the recording material P to be printed. The basis weight of the recording material P is determined by the user specifying the recording material P to be used for printing at the time of printing. The paper types of recording material P include plain paper and thick paper. For recording material P with a large basis weight, such as thick paper, long-time heating and pressure are required in the fixing nip portion N of the fixing device 50 to obtain sufficient fixing when the paper is fed into the fixing device 50. Therefore, in the present embodiment, the process speed can be switched to full speed (first feeding speed) or half speed (second feeding speed), where full speed is set when plain paper is specified and half speed is set when thick paper is specified.

[Control of the Feeding Interval of the Recording Material]

In the present embodiment, the control portion 60 controls the feeding interval of the recording materials fed from a feeding cassette 9 according to the temperature detected by the sub-thermistor 22*b*, which detects the temperature of the heater 21 corresponding to the non-paper passing area of the fixing nip portion N. The feeding interval of the recording material P is also the interval from the time the trailing end of the preceding recording material P (preceding recording material) passes through the fixing nip portion N to the time the leading edge of the subsequent recording material P (subsequent recording material) reaches the fixing nip portion N. In detail, the control portion 60 feeds the recording material P from the feeding cassette 9 at a predetermined feeding interval when the temperature detected by the sub-thermistor 22*b* is lower than the predetermined temperature. If the temperature detected by sub-thermistor 22*b* is higher than the predetermined temperature, the control portion 60 feeds the recording material P from the paper cassette 9 at the feeding interval. The standby time is longer (larger) when the detected temperature is higher, and the standby time added becomes shorter (smaller) when the detected temperature is lower. The control portion 60 then feeds the recording material P from the feeding cassette 9 at a predetermined feeding interval when the temperature detected by the sub-thermistor 22*b* is again lower than the predetermined temperature. This can mitigate the non-paper passing portion temperature increase of the fixing nip portion N. The throughput is reduced by increasing the feeding interval of the recording material P longer than the predetermined feeding interval. However, after the non-paper passing portion temperature increase of the fixing nip portion N is mitigated, the control portion 60 returns the feeding interval of the recording material P to the predetermined feeding interval. This prevents a decrease in productivity of the recording material.

Configuration Example 1

In configuration example 1, when small size plain paper is fed as a recording material P, the process speed is set to full speed, which is the maximum value. On the other hand, when a small-sized thick paper is fed as a recording material P, more heat is required to ensure fixation when it passes through the fixing nip portion N. Therefore, the process speed is set at half speed with the heater 21 set at a lower temperature (target temperature). Table 1 below shows the detected temperature of sub-thermistor 22*b* when the process speed is at full speed (in the table, the temperature is referred to as sub-thermistor temperature. Same for the following table). The table below shows the relationship between the temperature (unit: ° C.) and the standby time (unit: second) between recording material P and the paper feeding time. Table 2 shows the relationship between the temperature detected by the sub-thermistor 22*b* (unit: ° C.) and the standby time (unit: second) for paper feeding between recording materials P when the process speed is at half speed. The standby time between feeding materials P indicates the standby time that is added to the predetermined feeding interval between the preceding recording material P (preceding recording material) fed from the feeding cassette 9 and the subsequently fed recording material P (subsequent recording material). For example, in Table 1, when the process speed is full speed, the standby time is 0 seconds if the detected temperature of the sub-thermistor 22*b* is below 190° C. and the feeding interval between the preceeding recording material and the subsequent recording material remains at the predetermined feeding interval. On the other hand, when the temperature detected by the sub-thermistor 22*b* is 240° C. or higher, the paper-feeding standby time is 4 seconds. In addition, the subsequent recording material is fed from the feeding cassette 9 after (predetermined feeding interval+4 seconds) has elapsed after the preceeding recording material has been fed. In Table 2, when the process speed is half speed, the standby time for paper feeding is 0 seconds when the detected temperature of the sub-thermistor 22*b* is less than 210° C. In addition, the feeding interval between the preceeding recording material and the subsequent recording material remains at the predetermined feeding interval. On the other hand, when the temperature detected by the sub-thermistor 22*b* is 240° C. or higher, the paper-feeding standby time is 4 seconds. In addition, the subsequent recording material is fed from the feeding cassette 9 after (predetermined feeding interval+4 seconds) has elapsed after the preceeding recording material has been fed. As described below, due to the configuration of the image forming apparatus 100, it is difficult to stop image formation or stop feeding recording material P at the timing after an electrostatic latent image begins to form on the photosensitive drum 1. Therefore, the feeding interval of the recording material P fed from the feeding cassette 9 is controlled by adding the standby time for feeding the paper to the specified feeding interval of the recording material P. Therefore, the longer (larger) the standby time for feeding between recording material P, the lower the throughput, but the non-paper passing portion temperature rise of the fixing nip portion N is mitigated.

TABLE 1

| | Sub-thermister temperature (° C.) | | | | | | |
|---|---|---|---|---|---|---|---|
| | 180 | 190 | 200 | 210 | 220 | 230 | 240 and above |
| Feeding standby time (seconds) | 0 | 0 | 1 | 1.5 | 2 | 2.5 | 4 |

TABLE 2

| | Sub-thermister temperature (° C.) | | | | | | |
|---|---|---|---|---|---|---|---|
| | 180 | 190 | 200 | 210 | 220 | 230 | 240 and above |
| Feeding standby time (seconds) | 0 | 0 | 0 | 0 | 1 | 1.5 | 4 |

When the detection temperature of the sub-thermistor 22*b* (sub-thermistor temperature) rises above the predetermined temperature, whether the process speed is full-speed or half-speed, it is desirable to lengthen the paper-feeding standby time shown in Tables 1 and 2 is added to the predetermined feeding interval between recording material P. This is because the higher the temperature detected by the sub-thermistor 22*b*, the higher the temperature of the non-paper passing area of the fixing nip portion N is, and the longer standby time is required to alleviate the elevated temperature condition. The standby time for a half-speed process speed shown in Table 2 should be less than or equal to the standby time for a full-speed process speed shown in Table 1 at the same sub-thermistor temperature.

Furthermore, the sub-thermistor temperature, which requires the paper-feeding standby time shown in Table 2, should also be higher than in Table 1. This is related to the slower process speed and the lower fixing temperature setting of the heater 21. This is because when the process speed is slow, it allows time for the heat stored in the non-paper passing area of the heat-generating resistor 21*b* of the heater 21 to diffuse into the longitudinal direction of the heater 21. The lower fixing temperature setting at half process speed means that less power is consumed per unit time at the fixing device 50, i.e., less heat is generated per unit time at the fixing device 50, than at full process speed. As a result, when the process speed is at half speed, the range of temperature increase of the heater 21 corresponding to the non-paper passing area of the fixing nip portion N during printing of one recording material P is smaller than that at full speed. Therefore, the non-paper passing portion temperature increase can be mitigated with a short paper-feeding standby time relative to the detected temperature of the sub-thermistor 22*b*.

In configuration example 1, as shown in Tables 1 and 2, the paper-feeding standby time is set to be the maximum when the detection temperature of the sub-thermistor 22*b* is 240° C. to prevent image defects such as uneven fixing, uneven gloss, and high temperature offset caused by non-paper passing portion temperature increase. The point that the maximum paper-feed standby time is reached when the temperature detected by the sub-thermistor 22*b* is 240° C. is the same for the full-speed case (Table 1) and the half-speed case (Table 2), but need not necessarily be the same. In order to further increase productivity while suppressing non-paper passing portion temperature increase, it is preferable to establish multiple threshold values for the sub-thermistor temperature that determine the standby time for paper feeding, and then change the relationship between the sub-thermistor temperature and the standby time for paper feeding according to the process speed. In the present configuration example, the sub-thermistor temperature thresholds that determine the paper-feeding standby time are set every 10° C., but may be set more finely. If different process speeds can be set, such as ⅓ or ¼ for example, in addition to full speed and half speed, it is desirable to separately define the relationship between the sub-thermistor temperature and paper-feeding standby time according to the set process speed.

Table 3 shows the relationship between the paper-feeding standby time (in seconds) shown in Tables 1 and 2 and the throughput (in ppm) when A4-size recording material P is printed. Table 3 shows the throughput when printing A4 size recording material P (A4 paper) at full and half process speeds. For example, when the paper-feeding standby time is 0 seconds, the throughput is 30 ppm at full process speed and 15 ppm at half process speed, but as the paper-feeding standby time increases, the throughput decreases. Then, when the paper-feeding standby time is 4 seconds (for example, when the sub-thermistor temperature in Tables 1 and 2 is 240° C. or higher), the process speed is 10 ppm at full speed and 7 ppm at half speed.

TABLE 3

| | | Paper-feeding standby time (seconds) | | | | | |
|---|---|---|---|---|---|---|---|
| | | 0 | 1 | 1.5 | 2 | 2.5 | 4 |
| A4 paper throughput (ppm) | Full speed | 30 | 20 | 17 | 15 | 13 | 10 |
| | Half speed | 15 | 12 | 11 | 10 | 9 | 7 |

[Control Sequence for Feeding Control of the Recording Material]

Figure 7:
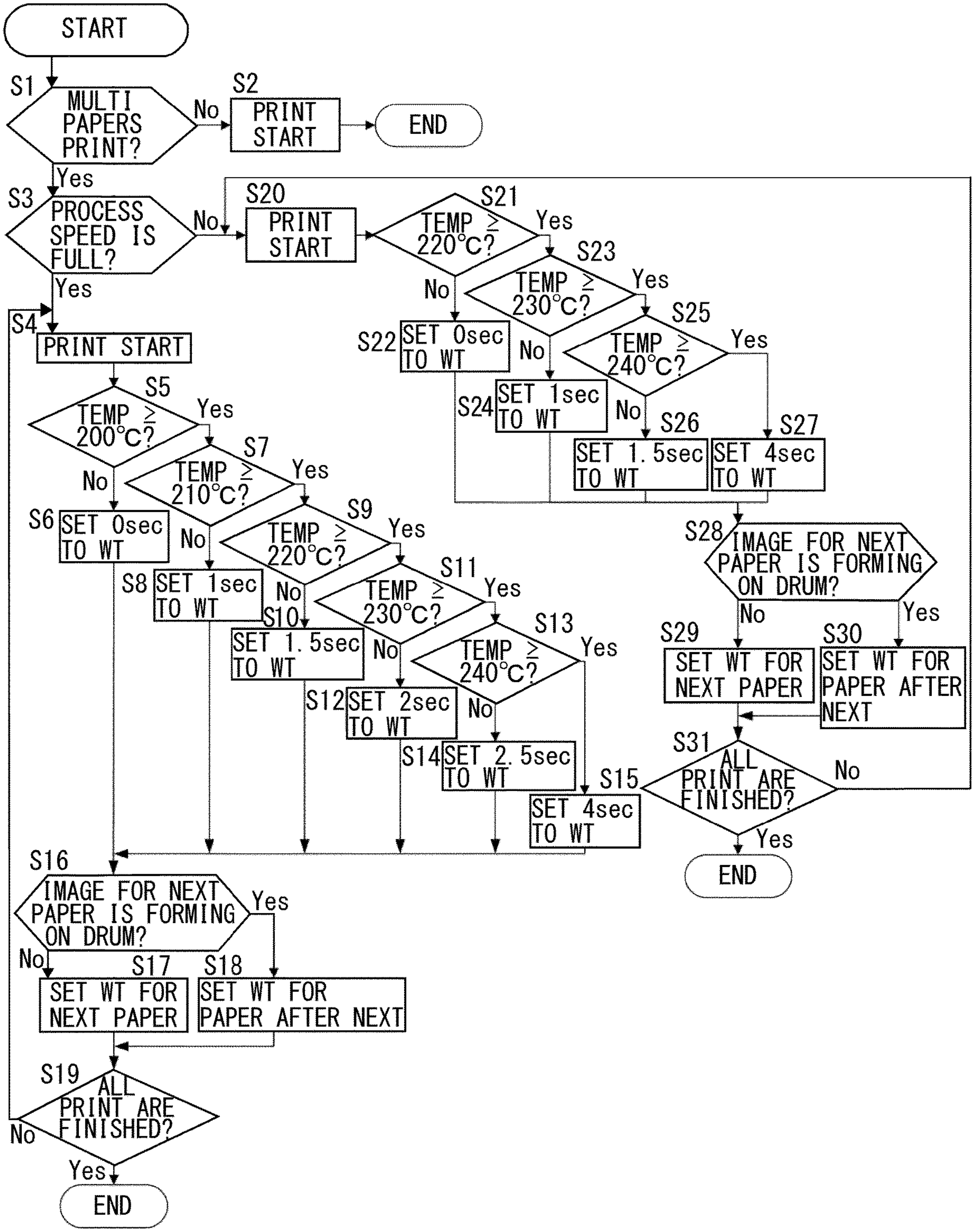
FIG. 7 is a flowchart showing a control sequence of a throughput control according to the first embodiment.

Next, the feeding control of a recording material in the present configuration example is explained. FIG. 7 is a flowchart showing the control sequence of the feeding control of the recording material in this configuration example. The process in FIG. 7 is started when the print signal for the recording material P is received and is executed by the control portion 60. Here, the size of the recording material P is assumed to be a small size (e.g., the minimum paper width of the recording material that can be fed as shown in FIG. 5). The standby time WT, which is the paper-feeding standby time described above, is set based on the paper-feeding standby time corresponding to the sub-thermistor temperatures in Tables 1 and 2 above.

In step (hereinafter referred to as S) 1, the control portion 60 determines whether to print on multiple sheets of recording material P. If the control portion 60 determines that printing is on multiple sheets of recording material P, it advances the process to S3, and if it determines that printing is on a single sheet of recording material P, it advances the process to S2. In S2, the control portion 60 starts printing one recording material P and terminates the process when printing is completed.

In S3, the control portion 60 determines if the set process speed is full speed. If the control portion 60 determines that the set process speed is full speed, it proceeds to S4, and if it determines that the set process speed is not full speed (the process speed is half speed), it proceeds to S20.

In S4, the control portion 60 starts printing the recording material P whose process speed is full speed. In S5, the control portion 60 acquires the detected temperature (sub-thermistor temperature) of the heater 21 corresponding to the non-paper passing area of the fixing nip portion N, as detected by the sub-thermistor 22*b* via the A/D conversion circuit 63, and determines whether the sub-thermistor temperature is 200° C. or higher. If the control portion 60 determines that the sub-thermistor temperature is 200° C. or higher, the process proceeds to S7, and if the sub-thermistor temperature is less than 200° C., the process proceeds to S6. In S6, the control portion 60 sets the standby time WT to 0 seconds and proceeds to S16.

In S7, the control portion 60 determines whether the acquired sub-thermistor temperature is 210° C. or higher. If the control portion 60 determines that the sub-thermistor temperature is 210° C. or higher, it proceeds to S9, and if the sub-thermistor temperature is less than 210° C., it proceeds to S8. In S8, the control portion 60 sets the standby time WT to 1 second and proceeds to S16.

In S9, the control portion 60 determines whether the acquired sub-thermistor temperature is 220° C. or higher. If the control portion 60 determines that the sub-thermistor temperature is 220° C. or higher, the process proceeds to S11, and if the sub-thermistor temperature is less than 220° C., the process proceeds to S10. In S10, the control portion 60 sets the standby time WT to 1.5 seconds and proceeds to S16.

In S11, the control portion 60 determines whether the obtained sub-thermistor temperature is 230° C. or higher. If the control portion 60 determines that the sub-thermistor temperature is 230° C. or higher, the process proceeds to S13, and if the sub-thermistor temperature is less than 230° C., the process proceeds to S12. In S12, the control portion 60 sets the standby time WT to 2 seconds and proceeds to S16.

In S13, the control portion 60 determines whether the acquired sub-thermistor temperature is above 240° C. (above the predetermined temperature). If the control portion 60 determines that the sub-thermistor temperature is 240° C. or higher, the process proceeds to S15, and if the sub-thermistor temperature is less than 240° C., the process proceeds to $14. In S14, the control portion 60 sets the standby time WT to 2.5 seconds and proceeds to S16. In S15, the control portion 60 sets the standby time WT to 4 seconds and proceeds to S16.

In S16, the control portion 60 determines whether the photosensitive drum 1 is in the process of forming an image to be printed on the next recording material P (next sheet). If the control portion 60 determines that the photosensitive drum 1 is in the process of forming an image for the next sheet, the process proceeds to S18, and if the control portion 60 determines that the photosensitive drum 1 is not forming an image to be printed on the next sheet, the process proceeds to S17. In S17, the control portion 60 sets the standby time WT to the paper-feeding standby time of the next recording material P (next sheet), because the control portion 60 can stop the feeding of the next sheet and standby if the image has not yet been formed on the photosensitive drum 1, and then proceeds to S19.

In S18, the control portion 60 sets the standby time WT to the paper-feeding standby time of the next recording material P (the following sheet) and proceeds to S19, because it cannot stop the feeding of the next paper if the next paper is already being imaged on the photosensitive drum 1. In S19, the control portion 60 determines whether printing of all recording material P has been completed. If the control portion 60 determines that printing of all recording material P has been completed, it terminates the process, and if it determines that printing of recording material P has not been completed, it returns the process to S4 and prints the next recording material P. When the process of S17 is executed, the control portion 60 performs the feeding of the next recording material P after the preceding recording material P has been fed and after a time has elapsed that is equal to the predetermined feeding interval of the recording material P plus the standby time WT, and the next recording material P is fed. Similarly, when the process of S18 is executed, the control portion 60 feeds the next recording material P (next sheet) after the preceding recording material P. Thereafter, after the time in which the standby time WT is added to the predetermined feeding interval of the recording material P has elapsed, the next recording material P (the following next sheet) of the next recording material P is fed.

In S20, the control portion 60 starts printing the recording material P, which has a process speed of half speed. In S21, the control portion 60 acquires the detected temperature (sub-thermistor temperature) of the heater 21 corresponding to the non-paper passing area of the fixing nip portion N detected by the sub-thermistor 22*b* via the A/D conversion circuit 63, and determines whether the sub-thermistor temperature is 220° C. or higher. If the control portion 60 determines that the sub-thermistor temperature is 220° C. or higher, the process proceeds to S23, and if the sub-thermistor temperature is less than 220° C., the process proceeds to S22. In S22, the control portion 60 sets the standby time WT to 0 seconds and proceeds to S28.

In S23, the control portion 60 determines whether the acquired sub-thermistor temperature is 230° C. or higher. If the control portion 60 determines that the sub-thermistor temperature is 230° C. or higher, the process proceeds to S25, and if the sub-thermistor temperature is less than 230° C., the process proceeds to S24. In S24, the control portion 60 sets the standby time WT to 1 second and proceeds to S28.

In S25, the control portion 60 determines whether the acquired sub-thermistor temperature is above 240° C. (above the predetermined temperature). If the control portion 60 determines that the sub-thermistor temperature is 240° C. or higher, it proceeds to S27, and if the sub-thermistor temperature is less than 240° C., it proceeds to S26. In S26, the control portion 60 sets the standby time WT to 1.5 seconds and proceeds to S28. In S27, the control portion 60 sets the standby time WT to 4 seconds and proceeds to S28.

In S28, the control portion 60 determines whether the photosensitive drum 1 is in the process of forming an image to be printed on the next recording material P (next sheet). If the control portion 60 determines that an image is being formed on the photosensitive drum 1 for the next sheet, the process proceeds to S30, and if it determines that an image is not being formed on the photosensitive drum 1 for printing on the next sheet, the process proceeds to S29. In S29, the control portion 60 sets the standby time WT to the paper-feeding standby time of the next recording material P (next paper), because the control portion 60 can stop the feeding of the next sheet to standby if the image has not yet been formed on the photosensitive drum 1, sets the standby time WT to the paper-feeding standby time of the next recording material P (next sheet), and then proceeds to S31.

In S30, the control portion 60 sets the standby time WT to the paper-feeding standby time of the next recording material P (the following sheet) and proceeds to S31, because it cannot stop the feeding of the next sheet if the next sheet is already being imaged on the photosensitive drum 1. In S31, the control portion 60 determines whether printing of all recording material P has been completed. If the control portion 60 determines that printing of all recording material P has been completed, it terminates the process, and if it determines that printing of recording material P has not been completed, it returns the process to S20 and prints the next recording material P. When the process of S29 is executed, the control portion 60 performs the feeding of the next recording material P after the preceding recording material P has been fed and after the time has elapsed which is the predetermined feeding interval of the recording material P plus the standby time WT. Similarly, when the S30 process is executed, the control portion 60 transports the next recording material P (next sheet) after the preceding recording material P. Thereafter, after the time in which the standby time WT is added to the predetermined feeding interval of the recording material P has elapsed, the next recording material P (the following next paper) of the next recording material P is fed.

As described above, in the feeding control of the recording material in this configuration example shown in FIG. 7, the paper-feeding standby time is determined based on the detected sub-thermistor 22*b* temperature. This makes it possible to optimally set the feeding interval for feeding the recording material P to which the paper-feeding standby time is added. In particular, the non-paper passing portion temperature increase of the fixing nip portion N is advanced by continuous printing of small-sized recording materials P. When the sub-thermistor temperature rises, the standby time is increased and the feeding interval of the recording material P is lengthened. This reduces throughput but mitigates the temperature increase in the non-paper passing area of the fixing nip portion N. If the temperature increase in the non-paper passing area of the fixing nip portion N is mitigated and the sub-thermistor temperature drops, the throughput can be increased by shortening the standby time according to the sub-thermistor temperature. Thus, by executing the feeding control of the recording material P according to the flow chart in FIG. 7, the non-paper passing portion temperature rise of the fixing nip portion N can be mitigated and the throughput can be improved quickly.

The control of the feeding interval of the recording material P should be done by continuously updating the standby time WT according to the sub-thermistor temperature at short time intervals. However, a sudden change in the paper-feeding standby time may cause repeated increases and decreases in the paper-feeding standby time (i.e., temperature increase and decrease in the non-paper passing portion of the fixing nip portion N), etc. In such cases, the control may be performed by raising and lowering the temperature in stages.

It is desirable that the timing to feed the recording material P by adding the paper-feeding standby time to the predetermined feeding interval of the recording material P should be as early as possible after the sub-thermistor temperature is detected. Due to the configuration of the image forming apparatus 100, it is difficult to stop image forming or stop the feeding of the recording material P at a timing after an electrostatic latent image has begun to form on the photosensitive drum 1. The difference in the distance that the toner image formed on the photosensitive drum 1 travels to the secondary transfer nip portion and the distance that the recording material fed from the feeding cassette 9 is fed to the secondary transfer nip portion causes a difference in the timing of the feeding of the recording material P and the timing of the image formation on the photosensitive drum 1. For example, if the distance fed from the feeding cassette 9 to the secondary transfer nip portion is longer than the distance fed from the feeding cassette 9, image formation on the photosensitive drum 1 is started after the feeding of the recording material P. Therefore, if image formation on the photosensitive drum 1 has not started when the paper-feeding standby time according to the sub-thermistor temperature is determined, the feeding of the recording material (i.e., the next paper as described above) on which the image formation is to take place can be performed at the feeding interval equal to the determined paper-feeding interval to which the paper-feeding standby time is added.

On the other hand, if the distance that the toner image formed on the photosensitive drum 1 travels to the secondary transfer nip portion is longer, the recording material P is fed from the feeding cassette 9 after image formation on the photosensitive drum 1 has started. Since image formation on the photosensitive drum 1 has started, the timing for the toner image on the photosensitive drum 1 to reach the secondary transfer portion is fixed. The timing of feeding of the recording material P from the feeding cassette 9 is determined so that the toner image on the photosensitive drum 1 is fed to the secondary transfer nip portion at the timing when the toner image on the photosensitive drum 1 reaches the secondary transfer portion. It is not possible to feed at the feeding interval to which the paper-feeding standby time is added. Therefore, if image formation on the photosensitive drum 1 has started at the time when the paper-feeding standby time is determined according to the sub-thermistor temperature, the following feeding control is performed. That is, the subsequent recording material P (i.e., the subsequent sheet as described above) fed after the recording material (i.e., the next sheet as described above) on which image formation is performed is fed at a feeding interval that is determined by adding the determined paper-feeding standby time. Thus, in the feeding control of the recording materials P in this configuration example, the feeding timing of the recording materials P can be controlled based on the standby time WT of the next sheet or the following sheet. This will suppress the non-paper passing portion temperature rise of the fixing nip portion N and improve productivity by reducing the throughput reduction.

Configuration Example 2

In configuration example 1, the paper-feeding standby time for the detected temperature of the sub-thermistor 22*b* was determined according to the process speed when printing the recording material P. This differs from configuration example 1 in that the paper-feeding standby time is determined according to the process speed when printing the recording material P. Table 4 below shows the relationship between the sub-thermistor 22*b* detection temperature (unit: ° C.) and the paper-feeding standby time (unit: second) between recording materials P when the basis weight of recording materials P is 90 g/m2 or less. Table 5 shows the relationship between the sub-thermistor 22*b* detection temperature (unit: ° C.) and the paper-feeding standby time (unit: second) between recording materials P when the basis weight of recording materials P is larger than 90 g/m2. The basis weight of the recording material P is determined by specifying the paper type of the recording material P to be used for printing. In the present configuration example, the process speed is set to full speed when the basis weight of the recording material P is 90 g/m2 or less, and the process speed is set to half speed when the basis weight of the recording material P is greater than 90 g/m2. The paper-feeding standby time between recording materials P for the detected temperature of the sub-thermistor 22*b* in Tables 4 and 5 are the same paper-feeding standby time as in Tables 1 and 2 of configuration example 1 and 2, respectively.

TABLE 4

| | Sub-thermister temperature (° C.) | | | | | | |
|---|---|---|---|---|---|---|---|
| | 180 | 190 | 200 | 210 | 220 | 230 | 240 and above |
| Feeding standby time (seconds) | 0 | 0 | 1 | 1.5 | 2 | 2.5 | 4 |

TABLE 5

| | Sub-thermister temperature (° C.) | | | | | | |
|---|---|---|---|---|---|---|---|
| | 180 | 190 | 200 | 210 | 220 | 230 | 240 and above |
| Feeding standby time (seconds) | 0 | 0 | 0 | 0 | 1 | 1.5 | 4 |

[Control Sequence for Feeding Control of a Recording Material]

Figure 8:
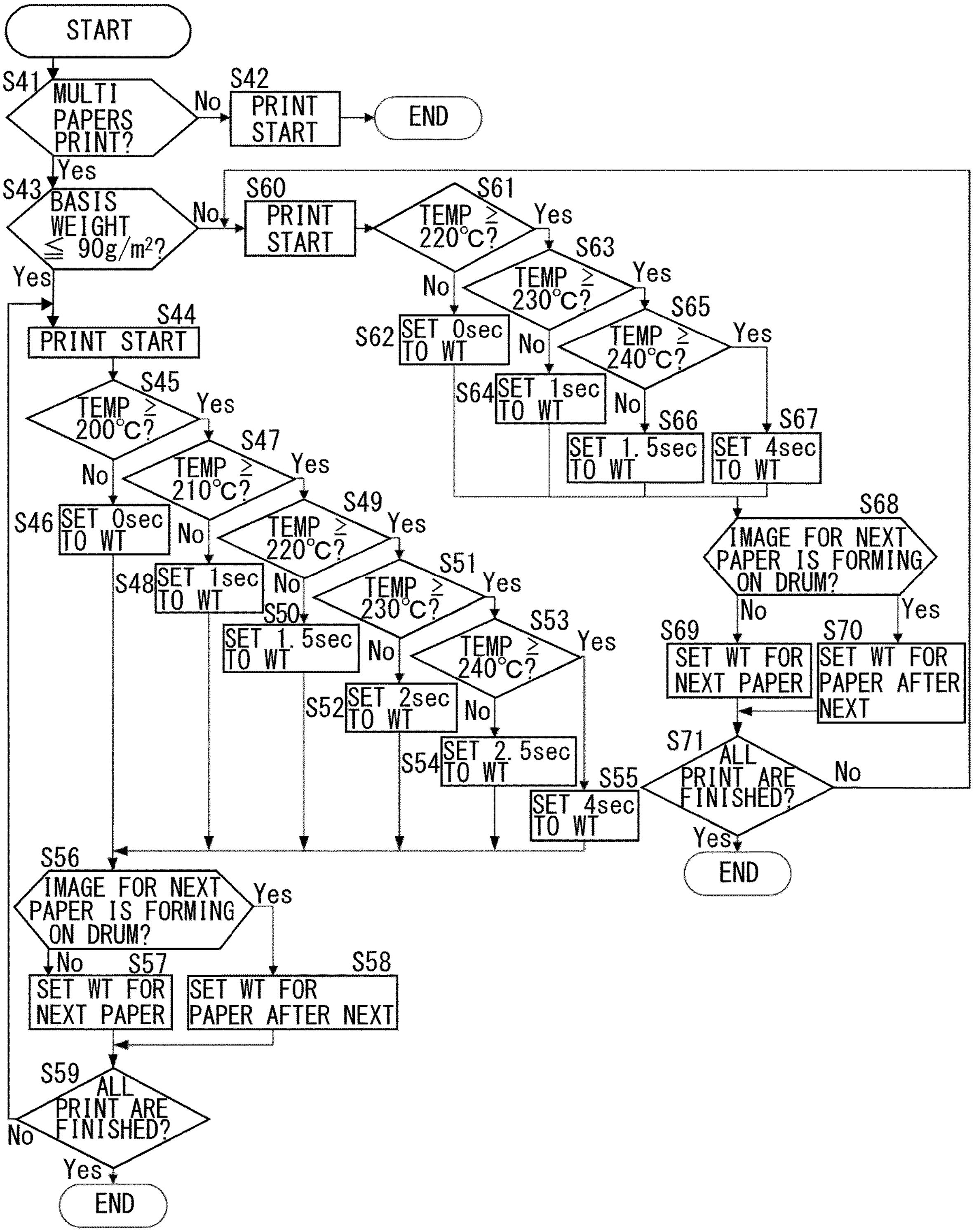
FIG. 8 is a flowchart showing a control sequence of a throughput control according to the second embodiment.

Next, the feeding control of the recording material in this configuration example is explained. FIG. 8 is a flowchart showing the control sequence of the feeding control of the recording material in this configuration example. As in FIG.

7 of configuration example 1, the process in FIG. 8 is started when the print signal for a recording material P is received, and is executed by a control portion 60. Here, the size of a recording material P is assumed to be a small size (e.g., a recording material with the smallest paper width that can be fed as shown in FIG. 5). The standby time WT, which is the paper-feeding standby time described above, is set to the paper-feeding standby time corresponding to the sub-thermistor temperature in Table 4 when the basis weight of a recording material P is 90 g/m2 or less. On the other hand, if the basis weight of the recording material P is greater than 90 g/m2, the paper-feeding standby time corresponding to the sub-thermistor temperature in Table 5 is set.

In S41, the control portion 60 determines whether or not to print on multiple sheets of recording material P. If the control portion 60 determines that it is printing on multiple sheets of recording material P, it proceeds to S43, and if it determines that it is printing on one sheet of recording material P, it proceeds to S42. In S42, the control portion 60 starts printing one recording material P and terminates the process when printing is completed.

In S43, the control portion 60 determines whether the basis weight of the recording material P is 90 g/m2 or less (predetermined value or less) (basis weight ≤90 g/m2?). If the control portion 60 determines that the basis weight of the recording material P is 90 g/m2 or less, it proceeds to S44. If it is determined that the basis weight of recording material P is not less than 90 g/m2 (basis weight >90 g/m2), the process proceeds to S60.

When the basis weight of a recording material P is 90 g/m2 or less, the processes from S44 to S59 are similar to the processes from S4 to S19 in FIG. 7, and the explanation here is omitted. The processes from S60 to S71, which are performed when the basis weight of a recording material P exceeds 90 g/m2, are similar to the processes from S20 to S31 in FIG. 7, and are omitted here.

It is preferable that the paper-feeding standby time for a recording material P (basis weight >90 g/m2) with a large basis weight be set below the paper-feeding standby time for recording material P (basis weight≤90 g/m2) with a small basis weight, when the sub-thermistor temperature is the same. In addition, it is preferable that the sub-thermistor temperature at which the paper-feeding standby time occurs is also higher for the recording material P (basis weight >90 g/m2) with a larger basis weight than for the recording material P (basis weight≤90 g/m2). This is related to the amount of heat that the recording material P takes away from the fixing nip portion N as it passes through the fixing device 50. In addition, the recording material P with a large basis weight removes more heat from the fixing nip portion N. Therefore, the non-paper passing portion temperature increase of the fixing nip portion N is less than that of the recording material P, which has a smaller basis weight. As a result, the temperature increase of the non-paper passing area of the fixing nip portion N is smaller for the recording material P with a large basis weight than for the recording material P with a small basis weight during the printing of one sheet of the recording material. Also, for the same sub-thermistor temperature, the non-paper passing portion temperature increase can be mitigated with a shorter paper-feeding standby time.

Configuration Example 3

Configuration example 3 is similar to configuration example 1 in determining the paper-feeding standby time, but the number and placement of sub-thermistors and the method for determining the sub-thermistor temperature are different. In configuration examples 1 and 2, a sub-thermistor 22*b* was installed on one end side of the longitudinal direction of a heater 21. Configuration example 3 has sub-thermistors 22*b* and 22*c* located on both end sides of the longitudinal direction of the heater 21. The higher of the temperatures detected by the two sub-thermistors 22*b* and 22*c*, respectively, is used as the sub-thermistor temperature for determining the paper-feeding standby time.

(Configuration of the Ceramic Heater)

Figure 9:
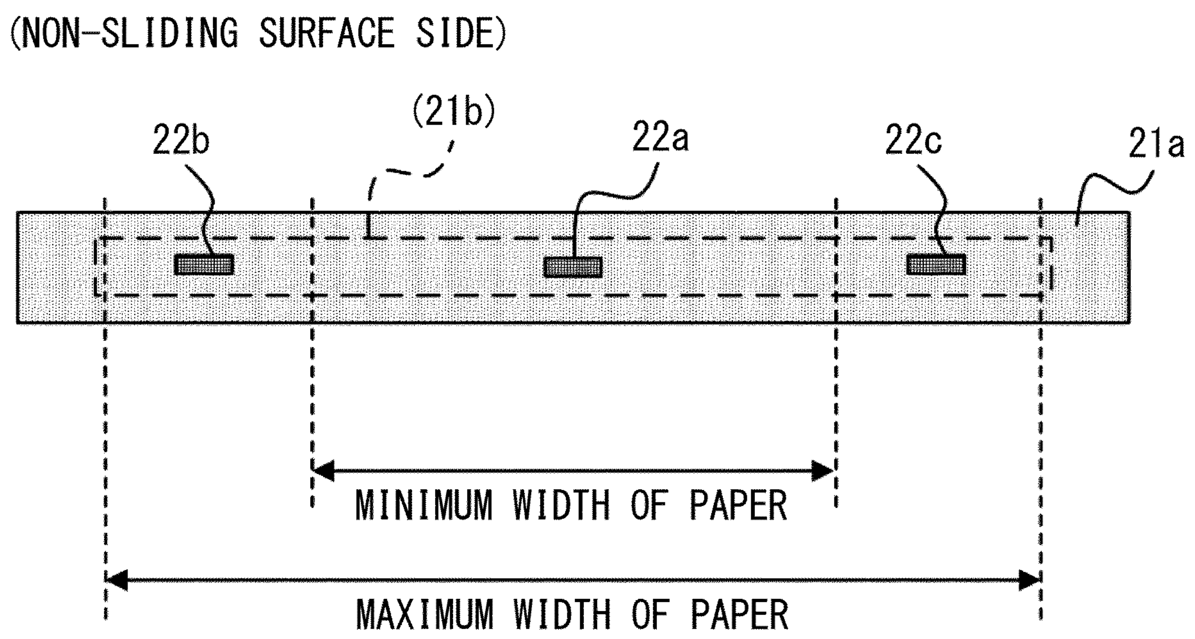
FIG. 9 is a schematic drawing showing a location of a thermistor according to the third embodiment.

FIG. 9 is a schematic drawing showing the positions of a thermistor 22*a*, sub-thermistors 22*b* and 22*c* when the ceramic heater 21 used in this configuration example of the fixing device 50 is viewed from the film non-sliding surface side, the side that does not slide against the film 24. In FIG. 9, the dashed line indicates a heat-generating resistor 21*b* located on the film sliding surface side of the heater 21. As shown in FIG. 9, the main thermistor 22*a*, sub-thermistor 22*b*, and sub-thermistor 22*c* are in contact with the plate 21*a* of the heater 21. The main thermistor 22*a* detects the temperature of the heater 21 corresponding to the feeding area of the fixing nip portion N through which the minimum width recording material P can be fed. On the other hand, sub-thermistors 22*b* and 22*c* are located in the area of the heater 21 corresponding to the non-paper passing area of the fixing nip portion N where the maximum width of the recording material P is fed and the minimum width of the recording material P is not fed. The area corresponding to the non-paper passing area of fixing nip portion N is on the left and right end sides of the figure in the longitudinal direction of the plate 21*a*, and the center of the plate 21*a* corresponding to the feeding area of the fixing nip portion N. The sub-thermistor 22*b* is located in the non-paper passing area on the left side of FIG. 9, and the sub-thermistor 22*c* is located in the non-paper passing area on the right side of FIG. 9.

The control portion 60 is used to determine the temperature of the heater 21 corresponding to the non-paper passing area of the fixing nip portion N detected by sub-thermistor 22*b*, the temperature of the heater 21 corresponding to the non-paper passing area of the fixing nip portion N detected by sub-thermistor 22*c*, and the temperature Tc of the heater 21 is acquired. The control portion 60 then adopts the higher of the temperatures Tb and Tc as the sub-thermistor temperature. This allows the control portion 60 to accurately detect the non-paper passing portion temperature increase in the other non-paper passing area, even if, for example, the recording material P is placed unevenly on either side of the non-paper passing area in the feeding cassette 9 (FIG. 1).

Configuration Example 4

Configuration example 4 is an example in which the paper-feeding standby time is the value obtained by adding the paper-feeding standby time 2 determined by the size of recording material P to the paper-feeding standby time 1 calculated according to Configuration example 1. Here, the size of the recording material is the paper length (length of the recording material P in the feeding direction) and paper width (length of the recording material P in the direction perpendicular to the feeding direction) of the recording material P. In other words, the feeding interval of the recording materials in configuration example 4 is the time obtained by adding paper-feeding standby time 1 and paper-feeding standby time 2 to the given feeding interval. In this configuration example, the paper-feeding standby time 2 corresponding to the size of the recording material P is added to the predetermined feeding interval, so the feeding interval of the recording material is longer than in configuration example 1.

Table 6 below shows the paper-feeding standby time 2 determined according to the paper length and the paper width of the recording material P. The narrower (smaller) the paper width is, the less heat is lost by the recording material P when the recording material P passes through the fixing nip portion N and the higher the temperature of the non-paper passing area of the fixing nip portion N. Therefore, in Table 6, the paper-feeding standby time 2 is set longer when the paper width is less than 155 mm than when the paper width is 155 mm or greater. The shorter the paper length, the higher the temperature of the non-paper passing portion of the fixing nip portion N when the recording material P passes through the fixing nip portion N. Therefore, in Table 6, when the paper length is less than 210 mm, the paper-feeding standby time 2 is set longer than when the paper length is 210 mm or longer. In the present configuration example, in addition to the paper-feeding standby time according to the process speed in configuration example 1, the paper-feeding standby time is based on the size of the recording material P. This allows the non-feeding portion temperature increase to be mitigated.

TABLE 6

| Paper length/Paper width | Less than 155 mm | 155 mm or more |
|---|---|---|
| 210 mm or more | 6 seconds | 4 seconds |
| Less than 210 mm | 8 seconds | 6 seconds |

Comparative Example

The comparative example is an embodiment in which the paper-feeding standby time is determined using only the sub-thermistor 22*b* detection temperature, as in the conventional image forming apparatus. Therefore, the paper-feeding standby time in the comparative example does not vary with process speed and the basis weight of a recording material P as in configuration examples 1 and 2. Table 7 below shows the relationship between the sub-thermistor 22*b* detection temperature (unit: ° C.) and the paper-feeding standby time between recording materials P (unit: second). In this comparative example, the paper-feeding standby time shown in Table 7 is set according to the detected sub-thermistor 22*b* temperature, regardless of process speed and basis weight. The paper-feeding standby time for the same detection temperature of sub-thermistor 22*b* shown in Table 7 is the same as the paper-feeding standby time for the same detection temperature of sub-thermistor 22*b* when the process speed is full speed in configuration example 1 and when the basis weight of recording material P is 90 g/m2 or less in configuration example 2.

TABLE 7

| | Sub-thermister temperature (° C.) | | | | | | |
|---|---|---|---|---|---|---|---|
| | 180 | 190 | 200 | 210 | 220 | 230 | 240 and above |
| Feeding standby time (seconds) | 0 | 0 | 1 | 1.5 | 2 | 2.5 | 4 |

Productivity in Configuration Examples 1~4 and Comparative Example

Table 8 shows the productivity and the average detection temperature of the sub-thermistor when the throughput control in configuration example 1, configuration example 2, configuration example 3, configuration example 4, and the comparative example described above are applied to continuous printing of A5 size recording materials P, a small size recording material, for 3 minutes. The A5 size recording paper P uses plain paper and thick paper, and the basis weight of thick paper is 100 g/m2.

TABLE 8

| | | Productivity (number of sheets) | Average sub-thermistor temperature during printing (° C.) |
|---|---|---|---|
| Configuration example 1 | Plain paper (full speed) | 70 | 238 |
| | Thick paper (half speed) | 48 | 238 |
| Configuration example 2 | Basis wait 90 g/m2 or less | 70 | 238 |
| | Basis wait bigger than 90 g/m2 | 48 | 238 |
| Configuration example 3 | Plain paper (full speed) | 70 | 238 |
| | Thick paper (half speed) | 48 | 238 |
| Configuration example 4 | Plain paper (full speed) | 65 | 220 |
| | Thick paper (half speed) | 38 | 220 |
| Comparative example | Plain paper (full speed) | 69 | 236 |
| | Thick paper (half speed) | 40 | 231 |

As shown in Table 8, the productivity of configuration examples 1, 2, and 3 is significantly higher than that of the comparative example when the process speed for printing thick paper with basis weight 100 g/m2 is at half speed. As mentioned above, the comparative example determines the paper-feeding standby time between recording materials P based solely on the sub-thermistor temperature, independent of the process speed. On the other hand, configuration examples 1 and 3 determine the paper-feeding standby time between recording materials P based on the sub-thermistor temperature and process speed, while configuration example 2 determines the paper-feeding standby time based on the sub-thermistor temperature and basis weight of the recording material P. Therefore, the productivity of configuration examples 1, 2, and 3 is greater than that of the comparison examples.

When the process speed is at half speed or the basis weight is larger than 90 g/m2, the temperature increase in the non-paper passing area is moderate. Therefore, higher productivity can be achieved than in the comparative example because the paper-feeding standby time between recording materials P can be shorter than when the process speed is full speed or basis weight is 90 g/m2 or less. In addition, there was no clear difference in productivity among configuration examples 1, 2, and 3 in this validation. This is because the throughput control for configuration examples 1, 2, and 3 is the same control sequence based on FIGS. 7 and 8 above. The difference in productivity between configuration examples 1 and 2 and configuration example 3 occurs, for example, when recording material P is placed unevenly in the feeding cassette 9, as described above. Configuration example 4 is effective in lowering the average detection temperature of the sub-thermistor 22*b* more during printing. For example, printing can be performed more safely even when printing is performed under conditions that are severe for temperature increase in the non-paper passing portion of the fixing nip portion N, such as when a long, thin strip of a recording paper P is fed into the fixing nip portion N.

As shown in Table 8, the average sub-thermistor temperature detected during printing was 231° C. for the thick paper (half-speed) in the comparative example, which is lower than the 238° C. of the configuration examples 1, 2, and 3.

This indicates that when the process speed in the comparative example is half speed, there is a margin for non-paper passing portion temperature increase of the heater 21, i.e., the paper-feeding standby time is the same as at full speed. Therefore, the paper-feeding standby time is longer than necessary at half speed. On the other hand, for configuration examples 1, 2, and 3, maximum productivity is achieved while non-paper passing portion temperature increase is allowed.

Figure 10:
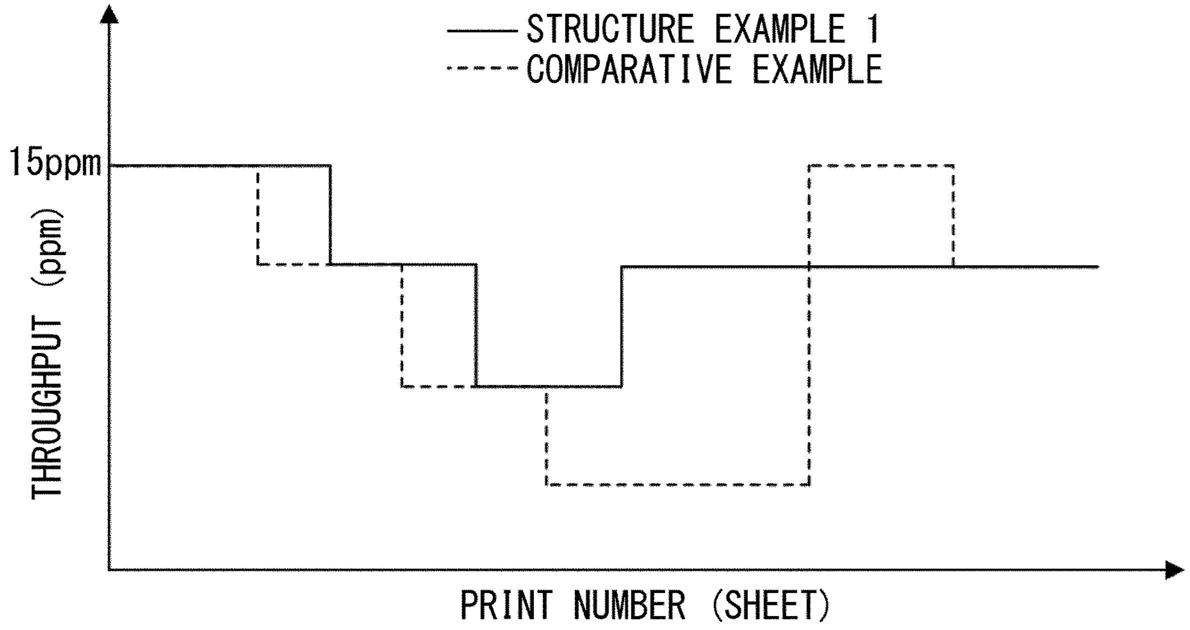
FIG. 10 is a drawing showing a throughput trend according to the first embodiment and a conventional embodiment.

Change in Throughput Between Configuration Example 1 and the Comparative Example when the Process Speed is in Half-Speed Mode FIG. 10 shows the throughput versus the number of sheets printed when continuously printing A5 size recording materials P with a basis weight of 100 g/m2. In FIG. 10, the solid line shows the change in throughput when the paper-feeding standby time in Table 2 of configuration example 1 is applied, and the dashed line shows the change in throughput when the paper-feeding standby time in Table 6 of the comparative example is applied. The horizontal axis in FIG. 10 shows the number of sheets printed on the recording material P (unit: sheets), and the vertical axis shows the throughput (unit: ppm). In both cases of applying configuration example 1 and the comparative example, printing is performed at the maximum throughput of 15 ppm when printing is started, but the number of printed sheets for which the maximum throughput is maintained is higher when configuration example 1, shown by the solid line, is applied than in the comparative example shown by the dashed line. As the number of printed sheets of recording material P increases, the throughput when configuration example 1 is applied is higher than the throughput when the comparative example is applied for the same number of printed sheets. This is because if the sub-thermistor temperatures are the same in configuration example 1 and the comparative example, i.e., the non-paper passing portion temperature increase is the same, the paper-feeding standby time in configuration example 1 is the same or shorter than the paper-feeding standby time in the comparative example. This is because the throughput control in the case of half process speed applying configuration example 1 is performed so that the throughput is equal to or greater than the throughput in the comparative example, where the throughput control is the same at half process speed as at full process speed. As a result, the time to maintain high throughput is longer when configuration example 1 is applied than when the comparative example is applied. Thus, in the image forming apparatus 100 with the present invention applied, the non-paper passing portion temperature increase of the heater 21 can be suppressed while optimizing productivity.

As explained above, according to the present embodiment, it is possible to control the feeding speed of the recording material or the feeding interval of the recording material to suppress the non-paper passing portion temperature increase in the fixing nip portion according to the type of the recording material.

According to the present invention, it is possible to control the feeding speed of the recording material or the feeding interval of the recording material to suppress the non-paper passing portion temperature increase in the fixing nip portion according to the type of the recording material.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-139656 filed on Aug. 30, 2021, which is hereby incorporated by reference herein in its entirety.

What is claimed is:

1. An image forming apparatus comprising:

an image forming unit configured to form an image on a recording material;

a first rotatable member;

a second rotatable member contacting an outer peripheral surface of the first rotatable member and configured to form a nip portion between the first rotatable member and the second rotatable member;

a heater disposed in an inside space of the second rotatable member;

a first temperature detecting unit, which is provided at a central position of the heater with respect to a longitudinal direction of the heater, configured to detect a temperature of the heater;

a second temperature detecting unit, which is provided at a position closer to an end side of the heater than the first temperature detecting unit with respect to the longitudinal direction of the heater, configured to detect a temperature of the heater; and a control unit configured to control an electric power supplied to the heater based on the temperature detected by the first temperature detecting unit, wherein in a case of continuously performing image formation on a plurality of recording materials, the control unit is configured to increase and decrease a feeding interval in which a trailing edge of a preceding recording material, which is included in the plurality of recording materials, passes through the nip portion until a leading edge of a subsequent recording material, which is included in the plurality of recording materials, reaches the nip portion, the feeding interval being increased and decreased based on a comparison with the temperature detected by the second temperature detecting unit and a temperature threshold value, and wherein, as the temperature threshold value, different values are set based on a basis weight of the plurality of recording materials.

2. An image forming apparatus according to claim 1, wherein the first temperature detecting unit is disposed in an area where the minimum width of the recording material that can pass through.

3. An image forming apparatus according to claim 2, wherein the second temperature detecting unit is disposed in an area where the minimum width of the recording material that cannot pass through.

4. An image forming apparatus according to claim 1, further comprising a feeding portion configured to feed the recording material, wherein the control unit controls the feeding portion so as to feed the subsequent recording material by the feeding after the feeding interval has elapsed from a timing when the preceding recording material is fed.

5. An image forming apparatus according to claim 1, wherein the second rotatable member includes a film.

6. An image forming apparatus according to claim 5, wherein the first rotatable member includes a pressing roller configured to form the nip portion with the film, and wherein the heater and the pressing roller nips the film and the image on the recording material is heated in the nip portion via the film.

* * * * *